(12) United States Patent
Urakami

(10) Patent No.: US 11,418,721 B2
(45) Date of Patent: Aug. 16, 2022

(54) IMAGE PICKUP APPARATUS

(71) Applicant: CANON KABUSHIKI KAISHA, Tokyo (JP)

(72) Inventor: Toshifumi Urakami, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/214,273

(22) Filed: Mar. 26, 2021

(65) Prior Publication Data

US 2021/0306545 A1 Sep. 30, 2021

(30) Foreign Application Priority Data

Mar. 30, 2020 (JP) .............................. JP2020-059691

(51) Int. Cl.
*H04N 5/235* (2006.01)
*H04N 5/232* (2006.01)
*H04N 5/225* (2006.01)

(52) U.S. Cl.
CPC ......... *H04N 5/2353* (2013.01); *H04N 5/2254* (2013.01); *H04N 5/23287* (2013.01)

(58) Field of Classification Search
CPC ............. H04N 5/2353; H04N 5/23287; H04N 5/2254; H04N 5/225; H04N 5/2252; H04N 5/2253; H04N 5/22525; H04N 5/23258; H04N 5/23274; G03B 9/36; G03B 17/563; G03B 17/14; G03B 17/02
See application file for complete search history.

(56) References Cited

U.S. PATENT DOCUMENTS

| 2010/0020184 A1* | 1/2010 | Kurosawa | H04N 5/2253 348/208.11 |
| 2021/0152720 A1* | 5/2021 | Awazu | G03B 9/36 |

FOREIGN PATENT DOCUMENTS

JP 2006-078897 A 3/2006

* cited by examiner

*Primary Examiner* — Lin Ye
*Assistant Examiner* — Tuan H Le
(74) *Attorney, Agent, or Firm* — Cowan, Liebowitz & Latman, P.C.

(57) ABSTRACT

An image pickup apparatus includes an image sensor configured to capture an object image, a shutter unit configured to move a shutter blade in a first direction and to control an exposure time to the image sensor, and a shake sensor configured to detect a shake of the image pickup apparatus. When viewed from an image plane side, the shake sensor is disposed away from the shutter unit in a second direction opposite to the first direction.

8 Claims, 7 Drawing Sheets

IMAGE PICKUP APPARATUS

BACKGROUND OF THE INVENTION

Field of the Invention

The present invention relates to an image pickup apparatus (referred to as a camera hereinafter) such as a digital camera having a shake sensor.

Description of the Related Art

Some cameras have a shake sensor, such as a gyro sensor, in order to reduce (correct) image blurs caused by camera shakes such as manual shakes. If the shake sensor is shaken due to the disturbance such as an impact, it cannot correctly detect a camera shaking amount, and the image stabilization cannot be performed with high accuracy.

Japanese Patent Laid-Open No. ("JP") 2006-78897 discloses a camera including a shake sensor held by a battery box, which is a member separate from a member holding a shutter unit as a vibration source, to restrain the vibration from propagating from the shutter unit to the shake sensor.

However, the camera disclosed in JP 2006-78897 cannot sufficiently restrain the vibration from propagating from the shutter unit to the shake sensor because a distance is short between the shutter unit and the shake sensor. In addition, holding the gyro sensor by the battery box will make larger the battery box and consequently a grip portion (holder) of the camera housing the battery box.

SUMMARY OF THE INVENTION

The present invention provides a compact image pickup apparatus that can restrain a vibration from propagating from a shutter unit to a shake sensor.

An image pickup apparatus according to one aspect of the present invention includes an image sensor configured to capture an object image, a shutter unit configured to move a shutter blade in a first direction and to control an exposure time to the image sensor, and a shake sensor configured to detect a shake of the image pickup apparatus. When viewed from an image plane side, the shake sensor is disposed away from the shutter unit in a second direction opposite to the first direction.

An image pickup apparatus according to another aspect of the present invention includes an image sensor configured to capture an object image, a shutter unit configured to move a shutter blade in a first direction and to control an exposure time to the image sensor, and a shake sensor configured to detect a shake of the image pickup apparatus. The shutter unit includes a contact portion configured to contact the shutter blade that has moved in the first direction or a blade driver that has driven the shutter blade in the first direction, so as to decelerate or stop the shutter blade. The shake sensor is disposed on a side opposite to the contact portion with respect to an optical axis when viewed from an image plane side.

Further features of the present invention will become apparent from the following description of exemplary embodiments with reference to the attached drawings.

DESCRIPTION OF THE EMBODIMENTS

Figure 1:
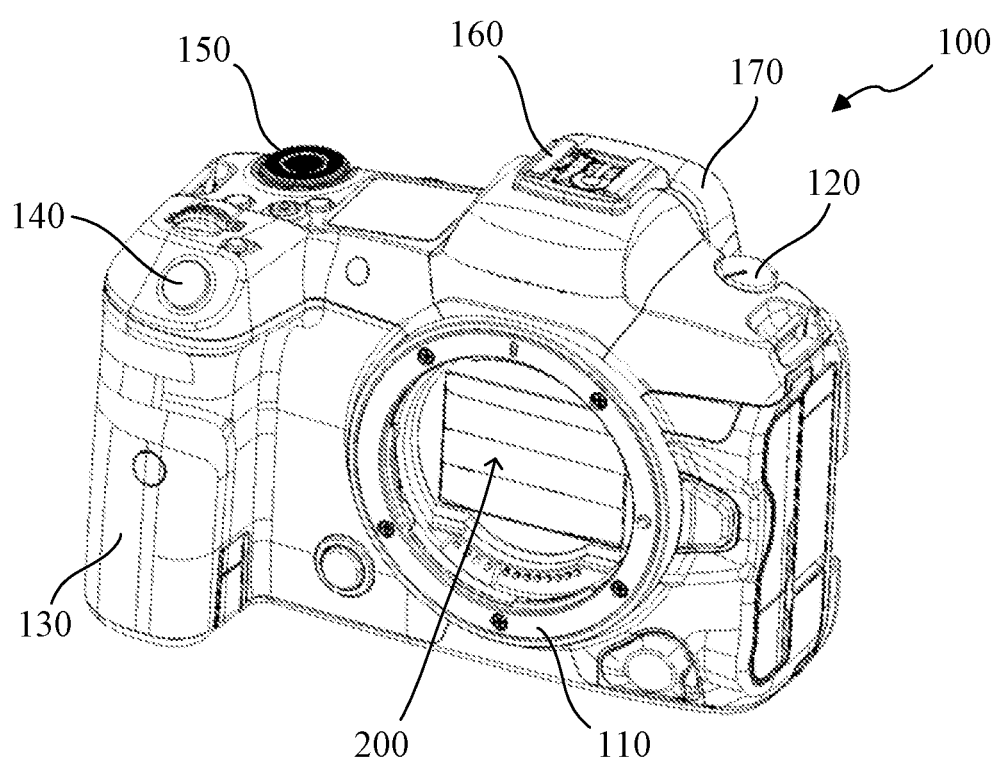
FIG. 1 is an external view of a camera according to one embodiment of the present invention.

Referring now to the accompanying drawings, a description will be given of embodiments according to the present invention. FIG. 1 illustrates the appearance of a lens interchangeable type digital camera (referred to as a camera hereinafter) 100 that serves as an image pickup apparatus according to one embodiment of the present invention. An unillustrated imaging lens unit (interchangeable lens) is attachable to and detachable from a mount portion 110 of the camera 100. The imaging lens unit forms an image of a luminous flux (imaging light flux) from an unillustrated object, and forms an object image on an image sensor 430 described later.

A power switch 120 is a rotary switch for powering on and off the camera 100. A grip portion 130 is a portion where the user holds the camera 100 by hand. A release button 140 is an operating member disposed above the grip portion 130 and operable by a user to instruct imaging. A dial 150 is an operating member operable by the user to switch an imaging condition of the camera 100, A camera accessory such as a flash unit is detachably attached to an accessory shoe 160. A viewfinder eyepiece 170 is a part of an electronic viewfinder unit described later, and is a portion through which the user observes the object using the electronic viewfinder.

Figure 2:
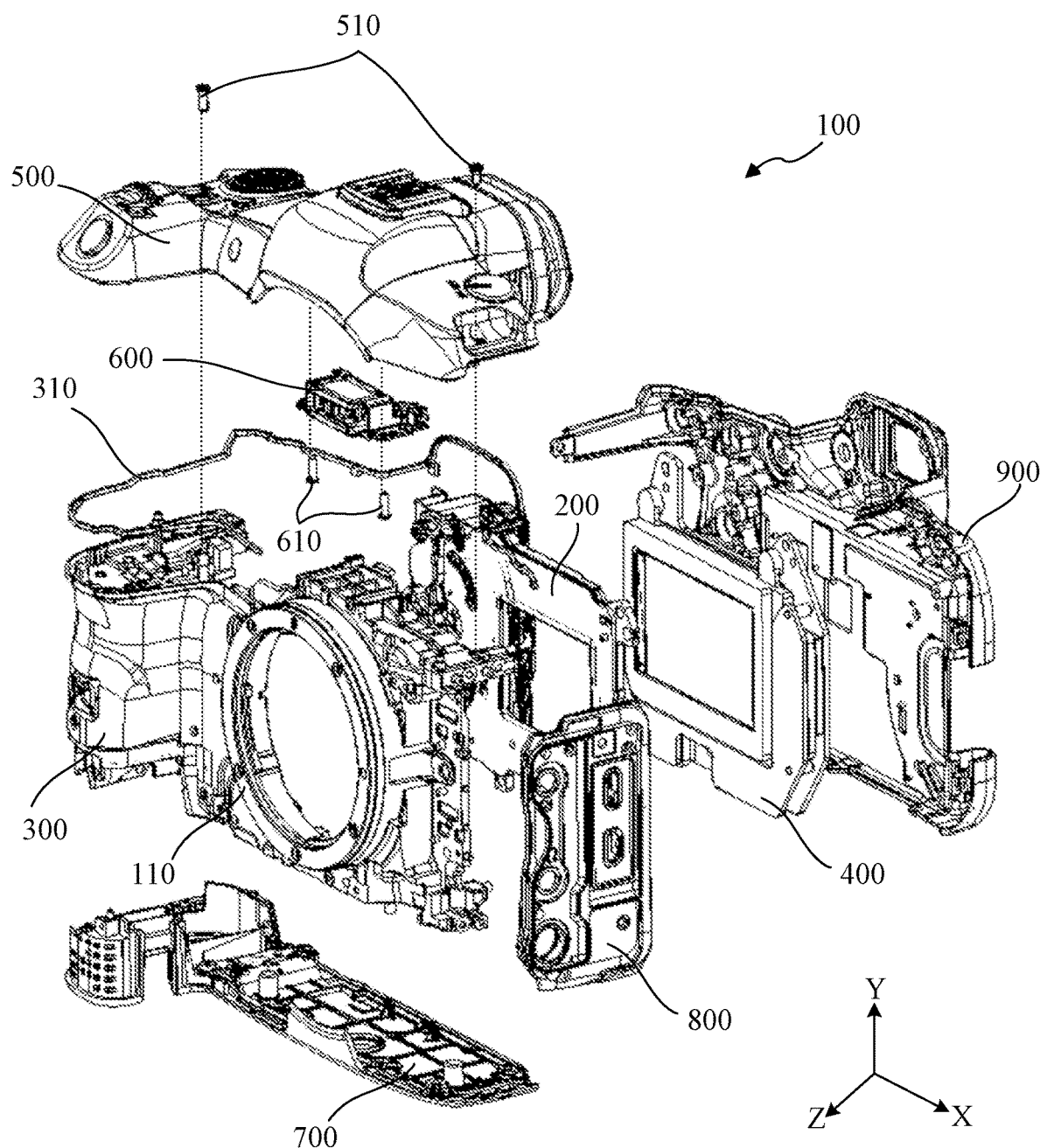
FIG. 2 is an exploded perspective view illustrating a structure of a camera according to an embodiment.

FIG. 2 illustrates the exploded camera 100. FIG. 2 omits parts that do not require explanation, such as the operating member and substrate. A body base 300 is a component that serves as a frame of the camera 100, and an exterior cover and various components described later are attached to the body base 300. The mount portion 110 is fixed to a front of the body base 300 on the object side (+Z direction) A top cover 500 as a first cover member (upper cover member) is attached to an upper part (in a+Y direction: second direction) of the body base 300, a bottom cover 700 is attached to a lower part (in a−Y direction: first direction) of the body base 300, and a side cover 800 is attached to a side part (in a+X direction) of the body base 300. A shutter unit 200, an imaging unit 400, and a rear cover 900 are attached to the rear part (in a−Z direction) of the body base 300 with screws. The body base 300 corresponds to a first holder that holds the shutter unit 200. The exterior cover of the camera 100 includes the top cover 500, the bottom cover 700, the side cover 800, and the rear cover 900.

The top cover 500 is attached to the body base 300 with screws 510 at both lateral (±X directions) ends thereof. A drip-proof member 310, which is an elastic member such as a sponge or rubber, is disposed along an outer circumference of the top cover 500 between the body base 300 and the top cover 500. The drip-proof member 310 prevents water droplets and the like from entering the gap between the top cover 500 and the body base 300.

A gyro sensor unit 600 that serves as a shake sensor is attached to the top cover 500 with screws 610 so that the gyro sensor 600 does not contact the body base 300. Thereby, the gyro sensor unit 600 is disposed above and away from the shutter unit 200 and the body base 300 in a second direction opposite to the first direction. The top cover 500 corresponds to a second holder that holds the gyro sensor unit 600.

The gyro sensor unit 600 includes a plurality of gyro sensors that detect the angular velocities of the shakes in pitch, yaw, and roll directions of the camera 100. The gyro sensor unit 600 is covered with a shock absorber such as sponge, rubber and gel in order to suppress shakes caused by the disturbance.

The shutter unit 200 is a focal plane shutter having a front blade unit and a rear blade unit each including a plurality of shutter blades. During imaging, the front blade unit moves (runs) from the light shielding position where the aperture (exposure opening) is closed to the exposure position where the aperture is opened, to pass the imaging light beam toward the image sensor 430. Thereafter, when the set exposure time (shutter speed) elapses, the rear blade unit moves from the exposure position to the light shielding position. This structure completes the imaging for acquiring one captured image.

The imaging unit 400 includes an optical low-pass filter 410 and an image sensor 430. The image sensor 430 is a photoelectric conversion element using a CMOS sensor, a CCD sensor, or the like, and captures (photoelectrically converts) an object image formed by the imaging lens unit and outputs an image signal. The imaging unit 400 includes an image stabilization mechanism. When camera shakes such as manual shakes occur, the gyro sensor unit 600 detects them, and the image sensor 430 is moved (shifted or rolled) in a direction orthogonal to the optical axis of the imaging lens unit (referred to as an imaging optical axis hereinafter) using the detection signal output from the gyro sensor unit 600. Thereby, an image stabilization is performed to reduce image blurs caused by camera shakes.

Figure 3:
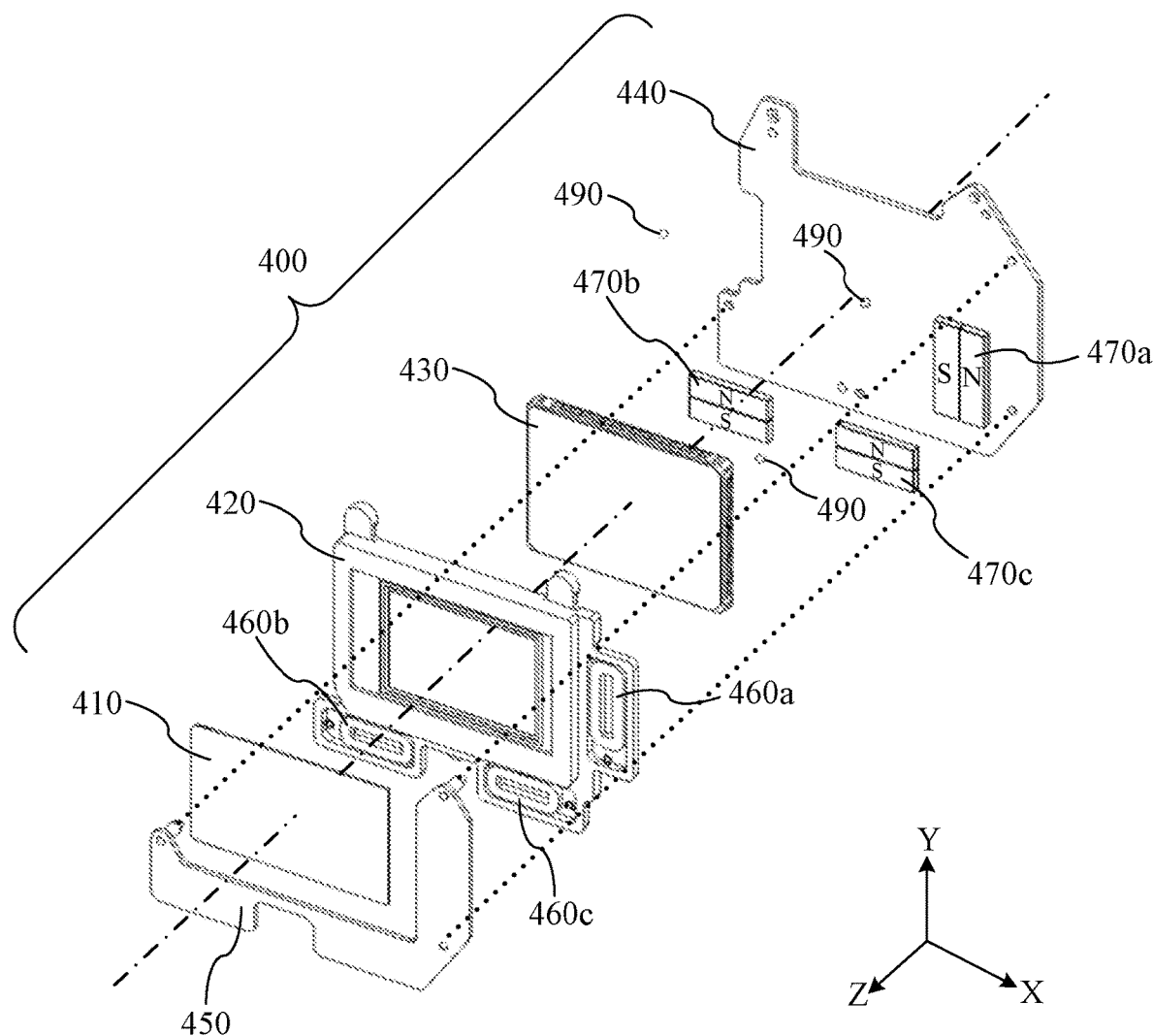
FIG. 3 is an exploded perspective view of an imaging unit in the camera according to the embodiment.

FIG. 3 illustrates the imaging unit 400 in an exploded manner. In FIG. 3, the imaging optical axis is set to the Z axis, and the direction in which the Z axis extends is set to the Z direction. The +Z direction is set to the front side. The lateral direction in which the X axis orthogonal to the Z axis extends is set to the X direction, and the vertical direction orthogonal in which the Y axis orthogonal to the Z axis and the X axis extends is set to the Y direction.

The imaging unit 400 includes the optical low-pass filter 410, the image sensor 430, and the image stabilization mechanism (shift holder 420, shift base 440, front base 450, drive coils 460a to 460c, and magnets 470a to 470c). The optical low-pass filter 410 has a rectangular shape using a single birefringent plate made of quartz, and is disposed in front of the image sensor 430. The shift holder 420 is a movable member that holds the optical low-pass filter 410 and the image sensor 430 and can move in the X direction, the Y direction, and the rolling direction. The image sensor 430 is fixed to the shift holder 420 by an unillustrated fastening member or by bonding.

The shift base 440 is disposed behind the image sensor 430. The front base 450 is an L-shaped member when viewed from the front side, and disposed on the opposite side (front side) of the shift base 440 with respect to the shift holder 420. The shift base 440 and the front base 450 are made of a soft magnetic material such as iron. The front base 450 is partially connected to the shift base 440 and integrated with the shift base 440. The shift base 440 and the front base 450 form a base member (fixed member) of the imaging unit 400. The shift base 440 is fixed to the body base 300 of the camera 100 with screws.

The X-direction drive coil 460a and Y-direction drive coils 460b and 460c are soldered to an unillustrated flexible substrate and fixed to the shift holder 420 by bonding. The X-direction drive coil 460a is disposed on the right side of the image sensor 430 when viewed from the front side. The Y-direction drive coils 460h and 460c are arranged symmetrically with respect to the YZ plane including the imaging optical axis on the lower side of the image sensor 430.

An X-direction magnets 470a and Y-direction magnets 470b and 470c are fixed to the shift base 440 by adhesion, N and S poles of the X-direction magnet 470a are aligned in the X direction, and the N and S poles of the Y-direction magnets 470b and 470c are aligned in the Y direction. The magnets 470a, 470b, and 470c are arranged so as to face the drive coils 460a, 460b, and 460c, respectively.

A plurality of (three in this embodiment) balls are rolling members sandwiched between the shift holder 420 and the shift base 440. Each ball 490 contacts a roll receiving surface formed on each of the shift holder 420 and the shift base 440, and the shift holder 420 moves relative to the shill base 440 and thereby rolls. The shift holder 420 is urged toward the shift base 440 by the magnetic attraction force of a magnet (not shown) or the elastic force of an elastic member. Thereby, the shift holder 420 and the shift base 440 sandwich the three balls 490 in a pressurized state between them.

The X-direction drive coil 460a and the Y-direction drive coils 460b and 460c form an electromagnetic driver together with the X-direction magnet 470a, and the Y-direction magnets 470b and 470c, respectively. When a current flows through each coil, the Lorentz force is generated and the shift holder 420 moves. B controlling an electrified amount of each coil, the shift holder 420 can be driven to various positions in the X direction, the Y direction, and the roll direction. By moving the image sensor 430 in the direction opposite to the camera shake direction, the image blurs can be reduced (corrected).

Figure 4:
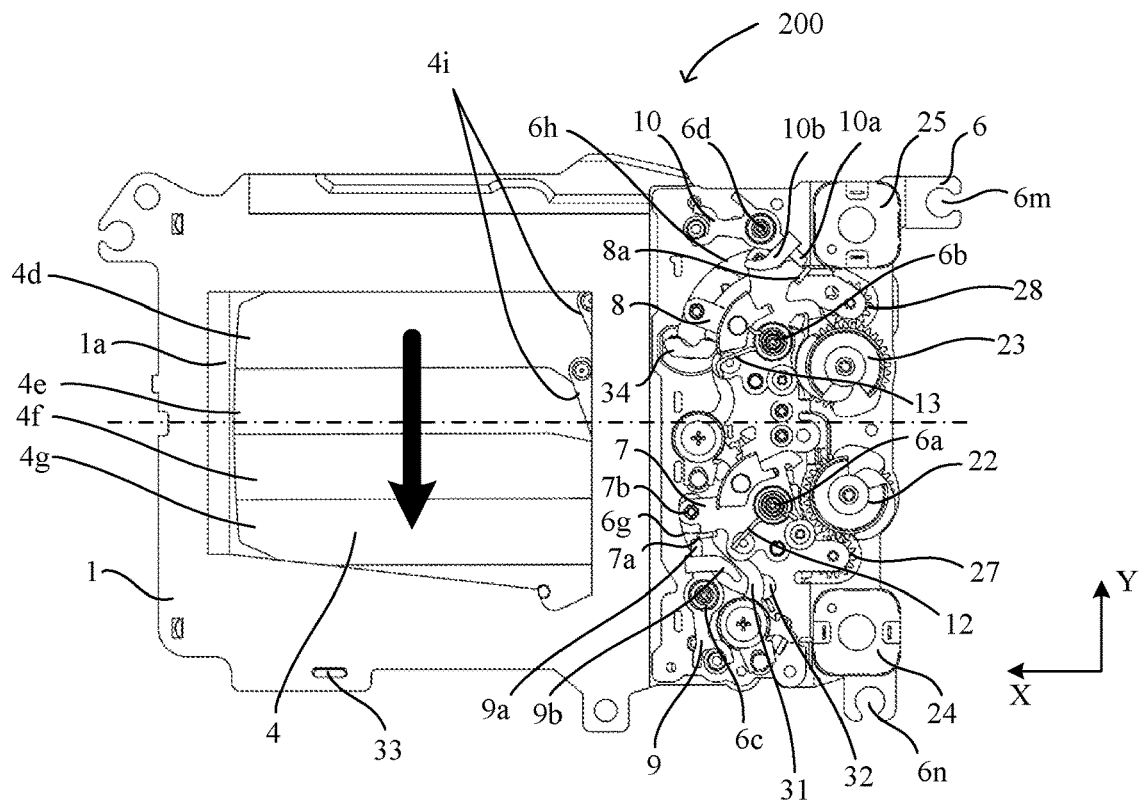
FIG. 4 illustrates a movement standby state of a shutter unit in the camera according to the embodiment.
Figure 5:
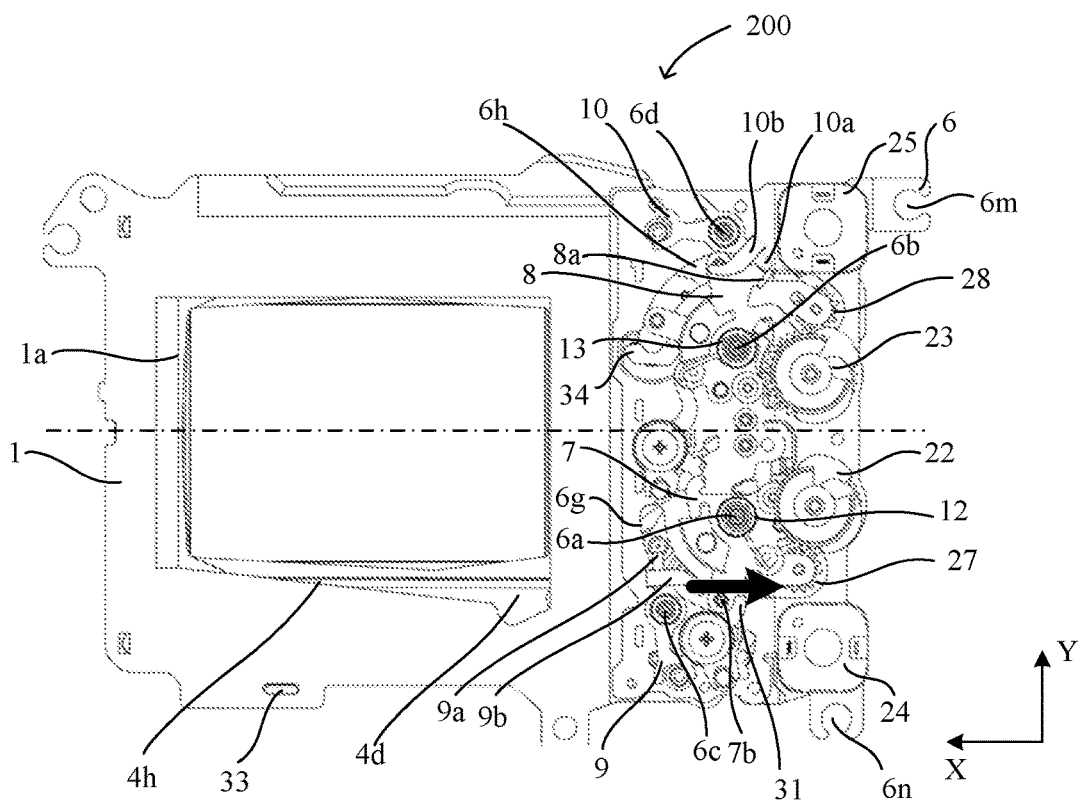
FIG. 5 illustrates a movement completed state of front blades of the shutter unit.
Figure 6:
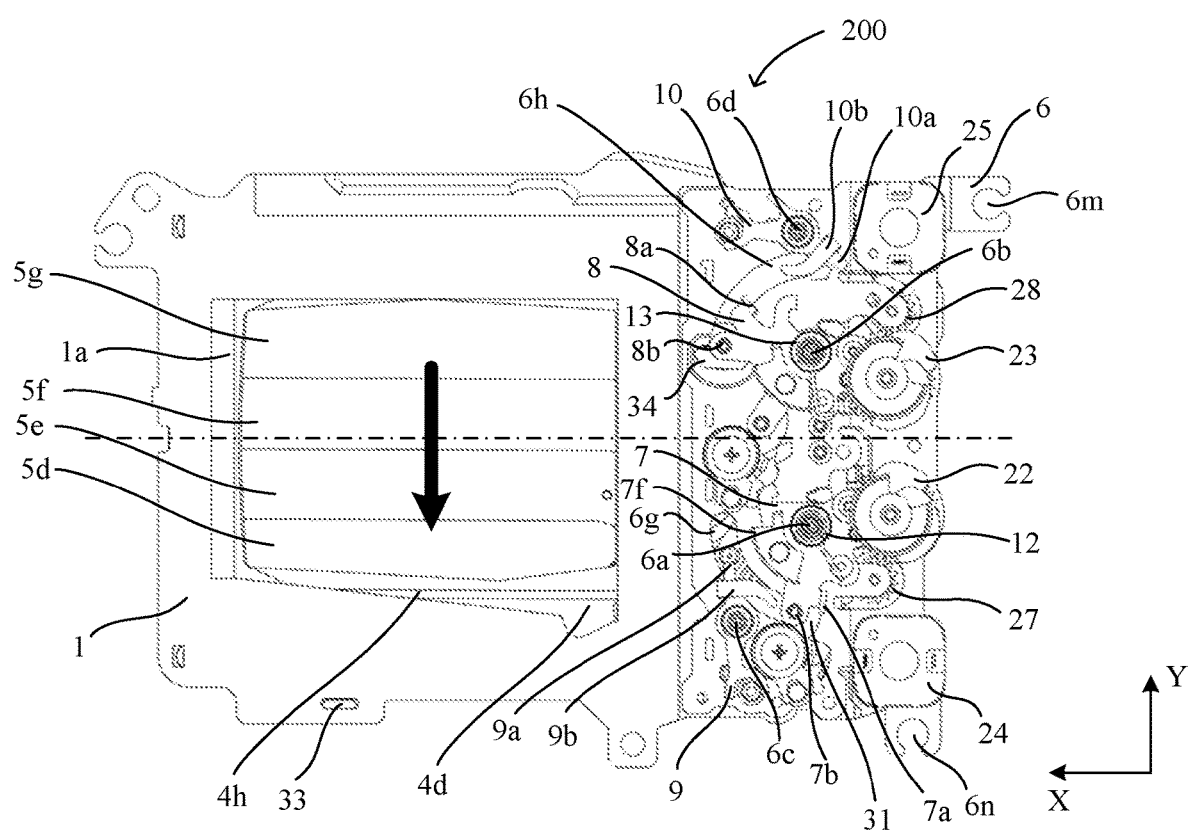
FIG. 6 illustrates an exposure end state of the shutter unit.
Figure 7:
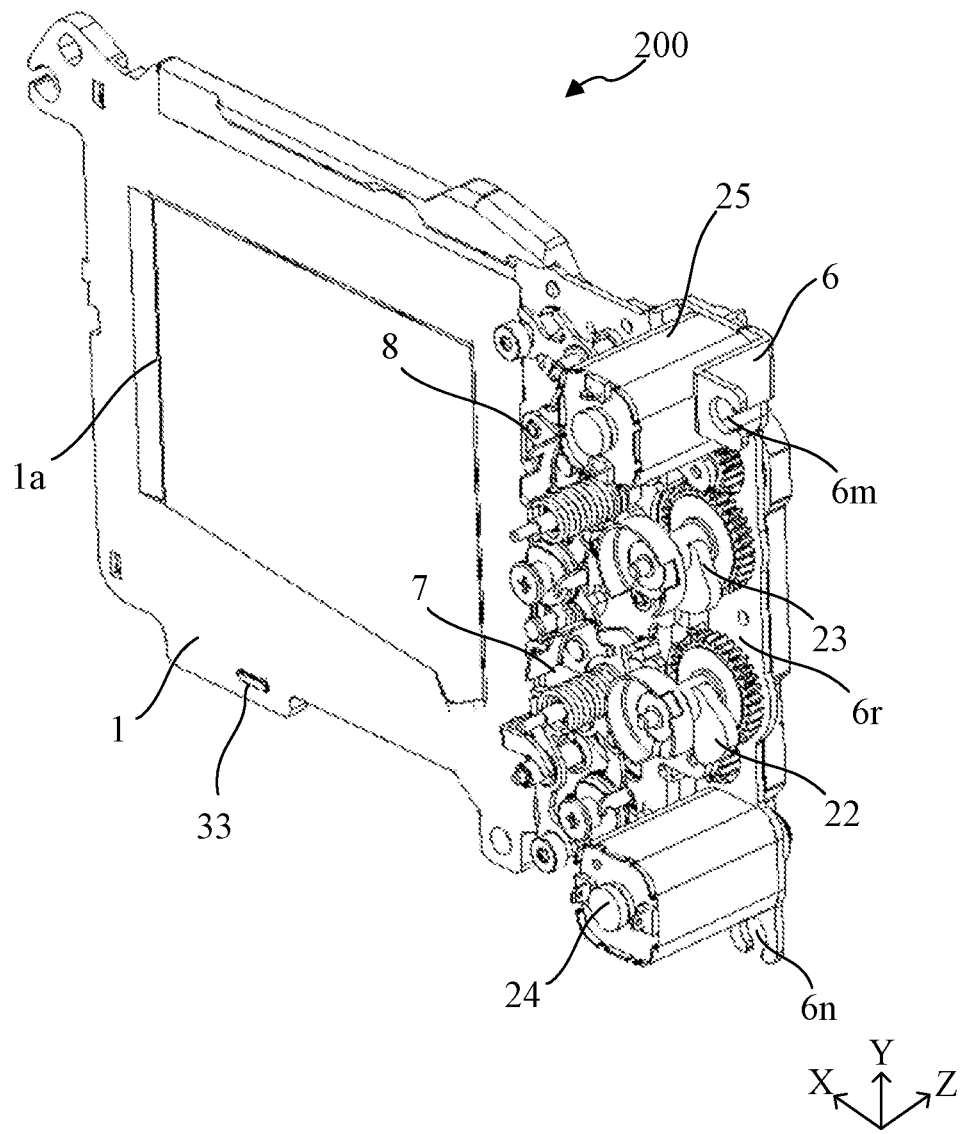
FIG. 7 is a perspective view of the shutter unit.

FIGS. 4, 5, and 6 illustrate the shutter unit 200 viewed from the rear (−Z side). FIG. 4 illustrates a movement standby state, FIG. 5 illustrates a movement completed state of the front blades, and FIG. 6 illustrates the shutter unit 200 in the exposure completed state. FIG. 7 illustrates the shutter unit 200 viewed from the diagonal back. However, FIG. 7 omits a front blade unit 4 and a rear blade unit 5.

The shutter unit 200 has a shutter base plate 1, the front blade unit 4, and the rear blade unit 5, described above. The shutter base plate 1 has an aperture 1a as the exposure opening described above. A front blade stopper 33 made of butyl rubber or the like and having a shock absorbing performance is provided under the shutter base plate 1, As will be described later, the front blade unit 4 that has moved comes into contact with the front blade stopper 33 and is stopped. The front blade stopper 33 corresponds to a contact portion or a first contact portion.

An auxiliary base plate 6 made of metal is fastened to the shutter base plate 1 with screws in order to improve its strength and to crimp various metal shafts. The auxiliary base plate 6 is provided with a plurality of shaft portions 6a, 6h, 6c, and 6d protruding toward the imaging unit side. A front driver 7, a rear driver 8, a front lock member 9, and a rear lock member 10 are rotatably attached to these shaft portions 6a, 6b, 6c, and 6d, respectively. A front drive source 24 and a rear drive source 25 composed of a DC motor or the like are fixed to the auxiliary base plate 6 by screws. The shutter unit 200 is screwed onto the base 300 with screws that are inserted into an upper hole portion (first fixed portion) 6m and a lower hole portion (second fixed portion) 6n provided at the upper and lower portions of the side portion of the auxiliary base plate 6.

A front cam gear 22, a rear cam gear 23, a front connecting gear 27, and a rear connecting gear 28 are rotatably attached to the auxiliary main plate 6, respectively. The front connecting gear 27 and the front cam gear 22 are engaged with the output shaft of the front drive source 24, and the rear connecting gear 28 and the rear cam gear 23 are engaged with the output shaft of the rear drive source 25. The rotational forces of the front drive source 24 and the rear drive source 25 are transmitted to the front cam gear 22 and the rear cam gear 23, respectively.

The front driver 7 and the rear driver 8, which are blade drivers, are urged in the counterclockwise direction when viewed from the rear by the urging forces of the front drive spring 12 and the rear drive spring 13, respectively, and are rotated against the urging forces of the front drive spring 12 and the rear drive spring 13 by the rotational force transmitted via the front cam gear 22 and the rear cam gear 23. At the set position, lock portions 7a and 8a provided on the front driver 7 and the rear driver 8 are engaged with lock portions 9a and 10a provided on the front lock member 9 and the rear lock member 10, respectively, and thereby the front driver 7 and the rear driver 8 are locked.

The front driver 7 and the rear driver 8 are provided with a front drive pin 7h and a rear drive pin 8b, respectively. The front drive pin 7b and the rear drive pin 8b penetrate slots 6g and 6h provided in the auxiliary base plate 6, respectively, and are engaged with the blade arm. A tip drive stopper 32 made of butyl rubber or the like and having a shock absorbing performance is disposed at one end of the slot 6g. The front driver 7 (or the front blade unit 4) rotated counterclockwise when viewed from the rear is stopped when the front drive pin 7b comes into contact with the front drive stopper 32.

A brake member 31 made of metal or the like is disposed on the rotation locus of the front drive pin 7b. When the front driver 7 rotates in the counterclockwise direction and the front drive pin 7b comes into contact with the brake member 31, the brake member 31 rotates clockwise while generating a friction with the front drive pin 7b, and retracts from the rotation locus of the front drive pin 7b. Thereby, the rotational speed of the front driver 7 (or the moving speed of the front blade unit 4) can be reduced. The front drive stopper 32 and the brake member 31 correspond to a contact portion or a second contact portion.

On the other hand, a rear drive stopper 34 made of butyl rubber or the like and having a shock absorbing performance is disposed at one end of the slot 6h. The rear driver 8 that has rotated counterclockwise when viewed from the rear is stopped when the rear drive pin 8b comes into contact with the rear drive stopper 34.

The front blade unit 4 includes a front blade arm 4i and a plurality of (four in this embodiment) shutter blades 4d, 4e. 4f, and 4g. The front blade arm 4i is rotatably attached to the auxiliary base plate 6. The four shutter blades 4d to 4g are rotatably attached to the front blade arm 4i. The rear blade unit 5 includes an unillustrated rear blade arm and a plurality of (four) shutter blades 5d, 5e, 5f, and 5g. The rear blade arm is rotatably attached to the auxiliary base plate 6. The four shutter blades 5d to 5g are rotatably attached to the rear blade arm. The number of shutter blades included in each of the front blade unit 4 and the rear blade unit 5 may be one or more other than four.

In the movement standby state illustrated in FIG. 4, the front blade unit 4 (4d to 4g) is unfolded and completely covers the aperture 1a, and the rear blade unit 5 (5d to 5g) is folded and housed above the aperture 1a.

When the release button 140 of the camera 100 is operated, the exposure operation is started. First, an unillustrated unlock member comes into contact with a presser 9b of the front lock member 9, so that the front lock member 9 rotates counterclockwise a shaft portion 6c as a center when viewed from the rear and unlocks the lock portion 7a of the driver 7. This disengagement rapidly rotates the front driver 7 counterclockwise around the shaft portion 6a as a center using the urging force of the front drive spring 12. Thereby, the front drive pin 7b rotates the front blade arm 4i in the counterclockwise direction, and the front blade unit 4 increases a folding amount of the four shutter blades 4d to 4g, moves in a moving direction (downward direction or first direction) from top to down indicated by an arrow in FIG. 4, and opens the aperture 1a.

When the shutter blade 4d of the front blade unit 4 that is moving approaches to the lower end of the aperture 1a, the front drive pin 7b comes into contact with the brake member 31, breaks the front driver 7 and decelerates the front blade unit 4. When a slit forming edge 4h, which is an upper end of the shutter blade 4d, reaches a position below the lower end of the aperture 1a, the first drive pin 7b comes into contact with the first drive stopper 32 and the first driver 7 stops. On the other hand, the front blade unit 4 comes into contact with the front blade stopper 33 described above in the folded state, and stops without protruding downward from the shutter base plate 1. In this way, the movement of the front blade unit 4 is completed, and the movement completed state of the front blades illustrated in FIG. 5 is made.

Thereafter, when the set exposure time elapses, the unillustrated unlock member comes into contact with the presser 10b of the rear lock member 10 and rotates the rear lock member 10 in the counterclockwise direction around the shaft portion 6d, and the rear driver 8 is disengaged from the lock portion 8a. This engagement rapidly rotates the rear driver 8 counterclockwise around the shaft portion 6b using the urging force of the rear drive spring 13. Thereby, the rear drive pin 8b rotates the rear blade arm in the counterclockwise direction, the rear blade unit 5 reduces a folding amount of the four shutter blades 5d to 5g in a moving direction from top to down indicated by an arrow in FIG. 6 and covers the aperture 1a.

When the slit forming edge as the lower end of the shutter blade 5d of the rear blade unit 5 that has moved reaches a position below the lower end of the aperture 1a, the rear drive pin 8b comes into contact with the rear drive stopper 34 and the rear driver 8 stops. As a result, the movement of the rear blade unit 5 is completed, and the exposure completed state illustrated in FIG. 6 is made.

Next follows a description of a structure that restrains the vibration caused by the movement of the front blade unit 4 of the shutter unit 200 from propagating to the gyro sensor unit 600. There are mainly two types of vibrations generated by the movement of the front blade unit 4 in the shutter unit 200. One type of vibration is one caused by the impact when the front blade unit 4 comes into contact with the front blade stopper 33 when the movement is completed. The other type of vibration is one caused by the impact when the front drive pin 7h of the front driver 7 rotates and comes into contact with the brake member 31 and the front drive stopper 32. When the vibration of the shutter unit 200 is transmitted to the gyro sensor unit 600, the camera shaking amount cannot be correctly detected by the gyro sensor unit 600, and the image stabilization cannot be accurately performed. In particular, since the vibration caused by the movement of the front blade unit 4 occurs during the exposure, it directly affects the quality of the image acquired by the imaging. Therefore, it is important to restrain the vibration caused by the movement of the front blade unit 4 from propagating to the gyro sensor unit 600.

As illustrated in FIG. 2, this embodiment fixes the shutter unit 200 as the vibration source onto the body base 300, the gyro sensor unit 600 that detects camera shakes onto the top cover 500, and the top cover 500 onto the body base 300. Thereby, the vibration of the shutter unit 200 is less likely to transmit to the gyro sensor unit 600 than a case where the gyro sensor unit 600 is directly fixed onto the body base 300. That is, the vibration propagating distance from the shutter unit 200 to the gyro sensor unit 600 is sufficiently secured by intervening the top cover 500, and the vibration attenuation to the gyro sensor unit 600 becomes large. Thus, the vibration propagating from the shutter unit 200 to the gyro sensor unit 600 becomes extremely small, and the adverse effect of the vibration of the shutter unit 200 on the image stabilization can be suppressed.

In particular, when the vibration in the high frequency band (900 to 1000 Hz) propagates from the shutter unit 200 to the gyro sensor unit 600, a resonance phenomenon occurs in the gyro sensor and the detecting error becomes significant. The vibration in this band is attenuated more significantly as the vibration propagating distance becomes longer, From this viewpoint as well, this embodiment can effectively suppress the adverse effect of the vibration of the shutter unit 200 on the image stabilization.

This embodiment has described the gyro sensor unit 600 held by the top cover 500, but the gyro sensor unit 600 may be held so as not to contact the body base 300 using another second holder provided inside the top cover 500.

In this embodiment, as described above, the top cover 500 is fixed to the body base 300 with screws 510 at both left and right ends. Thereby, the vibration of the shutter unit 200 first propagates to the body base 300 in the lateral direction, and then propagates to the top cover 500 via the fixed portion by the screw 510. Thereafter, the vibration propagates in the top cover 500 toward the central portion in the lateral direction in which the gyro sensor unit 600 is held, and finally, only a slight vibration propagates to the gyro sensor unit 600. Thus, although the gyro sensor unit 600 is spatially disposed close to the shutter unit 200 in the vertical direction, a long vibration propagating distance between them is secured.

As described above, the drip-proof member 310 disposed between the body base 300 and the top cover 500 serves as the drop resistance and absorbs the vibration from the body base 300 to the top cover 500. Therefore, it is possible to block the propagation of vibration to the gyro sensor unit 600 from a portion other than both lateral ends where the top cover 500 is fixed onto the body base 300. As a result, the vibration propagation to the gyro sensor unit 600 can be further suppressed.

Next follows a description of a structure for restraining the vibration of the shutter unit 200 from propagating to the top cover 500 via the body base 300. As described above, the vibration sources for the shutter unit 200 include the front blade stopper 33 with which the front blade unit 4 comes into contact when its movement is completed, and the brake member 31 and the front drive stopper 32 with which the front drive pin 7*b* comes into contact. This embodiment disposes these vibration sources as far as possible from the top cover 500 in which the gyro sensor unit 600 is held.

More specifically, this embodiment disposes them below (in the first direction from or on the side opposite to the shake sensor) the vertical center position of the aperture 1*a* in the shutter unit 200 (the position indicated by an alternate long and short dash line in FIGS. 4 to 6 and located on the imaging optical axis). Thereby, the above two vibrations propagate to the body base 300 via the lower hole portion 6*n* in the auxiliary base plate 6. The vibration propagating distance from the lower hole portion 6*n* in the auxiliary base plate 6 fixed to the body base 300 in the shutter unit 200 to the both lateral ends fixed to the body base 300 in the top cover 500 by the screws 510 is longer than that from the upper hole portion 6*m* in the auxiliary base plate 6 to the both lateral ends of the top cover 500. Therefore, it is possible to restrain the vibration of the shutter unit 200 from propagating to the top cover 500 via the body base 300, and consequently to reduce the vibration propagating to the gyro sensor unit 600.

In order to dispose the vibration sources for the shutter unit 200 below the imaging optical axis in this way, this embodiment first sets the moving direction of the front blade unit 4 during exposure to a direction (−Y direction) from top to bottom as illustrated in FIG. 4. That is, the front blade unit 4 is driven in the direction away from the top cover 500 in which the gyro sensor unit 600 is held. Then, the front blade stopper 33 that comes into contact with the front blade unit 4 when the movement is completed is disposed at the lower end portion of the shutter unit 200 (shutter base plate 1).

Second, this embodiment disposes the front driver 7 at a position away from the top cover 500 where the gyro sensor unit 600 is held, or below the center of the aperture 1*a* in the shutter unit 200. At this time, the brake member 31 and the front drive stopper 32, which the front drive pin 7*b* of the front driver 7 comes into contact with, may be disposed at positions as low as possible. If the front driver 7 is disposed below the imaging optical axis of the shutter unit 200 and the rear driver 8 is disposed above the imaging optical axis, the layout efficiency of the shutter unit 200 can be improved.

In this embodiment, the directions of the above two vibrations (impacts) are made different from each other. The direction of the impact generated when the front blade unit 4 that has moved from top to bottom comes into contact with the front blade stopper 33 is mainly the −Y direction. The direction of the impact generated when the front drive pin 7*b* comes into contact with the brake member 31 and the front drive stopper 32 is mainly a direction from the left to the right (−X direction) as illustrated by an arrow in FIG. 5.

That is, the directions of the above two impacts are orthogonal to each other. If the directions of the two impacts are made equal to each other, they are superimposed and a large vibration is generated. Therefore, this embodiment disperses the vibration energy by making the directions of the two vibrations different from each other, and reduces the vibration propagating to the gyro sensor unit 600. The directions of the two impacts may not be orthogonal to each other, as long as they are different from each other so as to reduce the vibration propagating to the gyro sensor unit 600.

In addition, as illustrated in FIG. 7, this embodiment provides the upper hole portion 6*m* on the side close to the top cover 500 in the auxiliary base plate 6 at a position away from the reference surface 6*r* of the auxiliary base plate 6 on which the front and rear drivers 7 and 8, the front and rear drive sources 24 and 25, and the front and rear cam gears 22 and 23, in the −Z direction (or the direction orthogonal to the reference surface 6*r*). More specifically, the auxiliary base plate 6 is provided with a bent portion that is bent in the −Z direction from the reference surface 6*r*, and the upper hole portion Cm is provided at the tip of the bent portion. In this way, by separating the upper hole portion 6m screwed to the body base 300 from the reference surface 6r of the auxiliary base plate 6, the vibration transmitted from the auxiliary base plate 6 to the body base 300 can be further attenuated. Thereby, the vibration propagating from the shutter unit 200 to the body base 300 can be reduced, and the vibration propagating from the body base 300 to the top cover 500 and the gyro sensor unit 600 can be reduced.

The lower hole portion 6n in the auxiliary base plate 6 on the side far from the top cover 500 may be provided on the same surface as the reference surface 6r of the auxiliary base plate 6.

Figure 8:
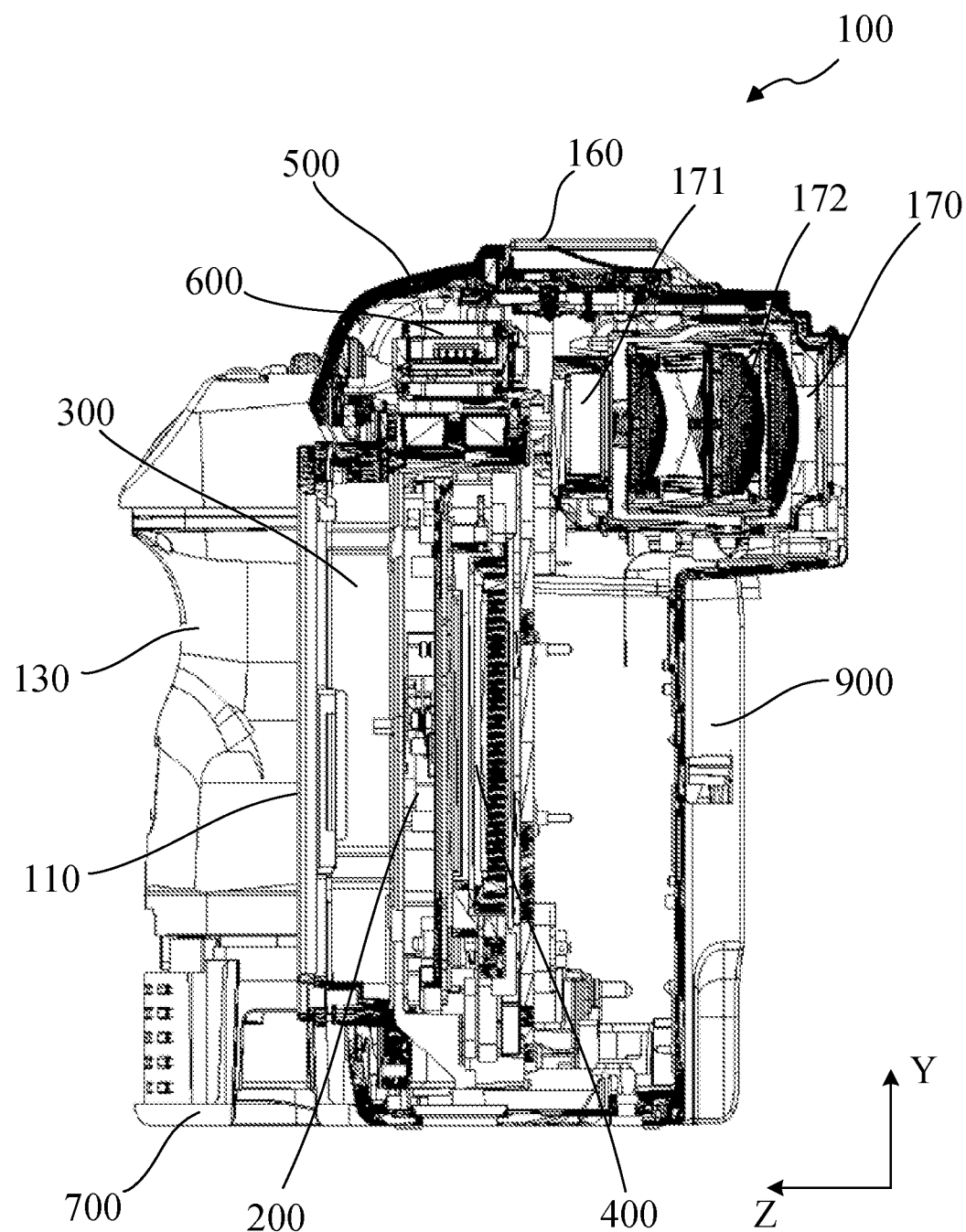
FIG. 8 is a sectional view of the camera according to the embodiment.

Next follows a description of an arrangement of the shutter unit 200 and the gyro sensor unit 600. FIG. 8 illustrates a side section of the camera 100 cut along the imaging optical axis. The gyro sensor unit 600 is disposed above the shutter unit 200 and the imaging unit 400 (in the +Y direction). An organic EL monitor 171, an eyepiece unit 172, and the viewfinder eyepiece 170 of the electronic viewfinder unit are arranged behind the gyro sensor unit 600 (in the −Z direction). The accessory shoe 160 is disposed above it.

In the layout of the components of the camera 100, the positions of the shutter unit 200, the imaging unit 400, the electronic viewfinder unit, and the accessory shoe 160 are almost fixed relative to the imaging optical axis. In this arrangement, disposing the gyro sensor unit 600 in the empty space above the shutter unit 200 can improve the layout efficiency, and the gyro sensor unit 600 can be disposed without increasing the size of the camera 100. If the gyro sensor unit is disposed in a space other than the space above the shutter unit 200 such as the space in the grip portion 130 as in the conventional case, the camera may become larger.

As described above, this embodiment can provide a compact camera 100 that can restrain the vibration from propagating from the shutter unit 200 to the gyro sensor unit 600 and perform the image stabilization with high accuracy.

This embodiment has discussed the case where the shutter blades move in the downward direction (first direction) in the shutter unit, but can reduce the influence of the vibration of the shutter unit on the shake sensor even when the shutter blades move in the upward direction, by holding the shake sensor with the upper cover disposed above the shutter unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-059691 filed on Mar. 30, 2020 which is hereby incorporated by reference herein in its entirety.

What is claimed is:

1. An image pickup apparatus comprising:
   an image sensor configured to capture an object image;
   a shutter unit configured to move a front shutter blade in a first direction and to control an exposure time to the image sensor; and
   a shake sensor configured to detect a shake of the image pickup apparatus,
   wherein when viewed from an image plane side, the shake sensor is disposed away from the shutter unit in a second direction opposite to the first direction,
   wherein the shutter unit includes a front contact portion configured to contact the front shutter blade that has moved in the first direction or a blade driver that has driven the front shutter blade in the first direction, so as to decelerate or stop the front shutter blade,
   wherein the front contact portion is disposed in the first direction viewed from a center of an exposure opening of the shutter unit,
   wherein the front contact portion does not come into contact with the front shutter blade or the blade driver before the front shutter blade moves in the first direction, and
   wherein the front contact portion comes into contact with the front shutter blade or the blade driver while the exposure opening is opening.

2. The image pickup apparatus according to claim 1, further comprising:
   a first holder configured to hold the shutter unit; and
   a second holder disposed in the second direction viewed from the shutter unit,
   wherein the shake sensor is held by the second holder so that the shake sensor does not contact the first holder.

3. The image pickup apparatus according to claim 2, wherein the second holder is a first cover member that is a part of an exterior cover of the image pickup apparatus.

4. The image pickup apparatus according to claim 1, wherein the front contact portion includes:
   a first front contact portion configured to come into contact with the front shutter blade that has moved in the first direction so as to stop the front shutter blade; and
   a second front contact portion configured to come into contact with the blade driver that has driven the front shutter blade in the first direction so as to decelerate or stop the blade driver,
   wherein a direction in which the front shutter blade comes into contact with the first front contact portion and a direction in which the blade driver comes into contact with the second front contact portion are different from each other.

5. The image pickup apparatus according to claim 4, wherein the direction in which the front shutter blade comes into contact with the first front contact portion and the direction in which the blade driver comes into contact with the second front contact portion are orthogonal to each other.

6. The image pickup apparatus according to claim 1, wherein the image pickup apparatus is configured to provide an image stabilization by moving the image sensor using an output from the shake sensor.

7. The image pickup apparatus according to claim 1, further comprising a mount portion attachable to and detachable from an interchangeable lens,
   wherein the shutter unit and the shake sensor are disposed between the mount portion and the image sensor in an optical axis direction, and
   wherein the shake sensor is disposed at a position more distant from an optical axis in a direction orthogonal to the optical axis than a position of the shutter unit.

8. The image pickup apparatus according to claim 1, wherein the shake sensor is disposed on a side opposite to the front contact portion with respect to an optical axis when viewed from the image plane side.

* * * * *